(12) United States Patent
Lakerdas et al.

(10) Patent No.: US 7,112,907 B2
(45) Date of Patent: Sep. 26, 2006

(54) FLUX MODIFIER FOR A PERMANENT MAGNET BRUSH-TYPE MOTOR USING WOUND FIELD COILS COMBINED WITH PERMANENT MAGNETS

(75) Inventors: Andrew Lakerdas, London (CA); Attila Simofi-Ilyes, London (CA); John E. Makaran, London (CA); Corneliu Dragoi, London (CA); Peter A. Kershaw, London (CA); Martin Volkening, London (CA)

(73) Assignee: Siemens VDO Automotive Inc., Chatham (CA)

( * ) Notice: Subject to any disclaimer, the term of this patent is extended or adjusted under 35 U.S.C. 154(b) by 3 days.

(21) Appl. No.: 10/842,872

(22) Filed: May 11, 2004

(65) Prior Publication Data

US 2005/0127772 A1    Jun. 16, 2005

Related U.S. Application Data

(60) Provisional application No. 60/529,191, filed on Dec. 12, 2003.

(51) Int. Cl.
*H02K 1/00* (2006.01)
(52) U.S. Cl. .................... 310/181; 310/194; 310/254
(58) Field of Classification Search ........ 310/179–181, 310/194, 199, 216, 254, 261
See application file for complete search history.

(56) References Cited

U.S. PATENT DOCUMENTS

| | | | |
|---|---|---|---|
| 2,193,406 A | * | 3/1940 | Goss et al. ............... 310/181 |
| 2,923,873 A | | 2/1960 | Annix |
| 3,582,742 A | | 6/1971 | Martin |
| 3,984,711 A | * | 10/1976 | Kordik ................... 310/49 R |
| 4,019,106 A | | 4/1977 | Van Doren |
| 4,039,853 A | | 8/1977 | Koizumi et al. |
| 4,230,979 A | | 10/1980 | Espelage et al. |
| 4,365,189 A | | 12/1982 | Hawkins et al. |
| 4,378,855 A | | 4/1983 | Haub et al. |
| 4,422,022 A | | 12/1983 | Hill et al. |
| 4,535,263 A | | 8/1985 | Avery |
| 4,544,870 A | | 10/1985 | Kearns et al. |
| 4,730,151 A | | 3/1988 | Florey et al. |
| 4,910,790 A | | 3/1990 | Kershaw |
| 5,079,468 A | | 1/1992 | Sata |
| 5,168,201 A | | 12/1992 | Nomura |
| 5,291,115 A | | 3/1994 | Ehsani |
| 5,332,954 A | | 7/1994 | Lankin |
| 5,489,831 A | | 2/1996 | Harris |

(Continued)

FOREIGN PATENT DOCUMENTS

JP    55162896    12/1980

(Continued)

*Primary Examiner*—Thanh Lam

(57) ABSTRACT

A stator and armature assembly 12 is provided for a permanent magnet DC motor. The assembly includes an armature 13 having a lamination core 14 and windings 15, and a stator structure 16 associated with the armature. The armature is constructed and arranged to rotate with respect to the stator structure. The stator structure includes at least one permanent magnet 22 providing a certain flux, and at least one wound core structure 17 having a core 18 and a coil 19 wound about the core so as to define an alternate pole with respect to the permanent magnet. When current to the coil is controlled, flux of the stator structure 16 can be increased or decreased relative to the certain flux. In this way a motor can operate at different speeds.

26 Claims, 7 Drawing Sheets

U.S. PATENT DOCUMENTS

| | | |
|---|---|---|
| 5,789,896 A | 8/1998 | Fischer et al. |
| 5,838,134 A | 11/1998 | Cummins |
| 5,859,509 A | 1/1999 | Bienz et al. |
| 5,959,387 A | 9/1999 | Mowery et al. |
| 6,093,992 A * | 7/2000 | Akemakou ............ 310/156.55 |
| 6,342,746 B1 * | 1/2002 | Flynn ........................ 310/181 |
| 6,346,756 B1 | 2/2002 | Ishikawa et al. |
| 6,373,162 B1 | 4/2002 | Liang et al. |
| 6,448,676 B1 | 9/2002 | Kershaw et al. |
| 6,462,506 B1 | 10/2002 | Cochoy et al. |
| 6,563,248 B1 * | 5/2003 | Fujita ........................ 310/181 |
| 6,617,816 B1 | 9/2003 | Ohno et al. |
| 6,630,764 B1 | 10/2003 | Dube et al. |
| 2002/0047349 A1 | 4/2002 | Lee |
| 2002/0047766 A1 * | 4/2002 | Futami et al. .............. 335/284 |
| 2003/0111919 A1 | 6/2003 | Lau |

FOREIGN PATENT DOCUMENTS

| | | |
|---|---|---|
| JP | 5866596 | 4/1983 |

* cited by examiner

| MOTOR SPEED OPERATION | OFF | MEDIUM | HIGH | LOW |
|---|---|---|---|---|
| CURRENT THROUGH FIELD WOUND COILS | 0 | 0 | POSITIVE | NEGATIVE |
| K1 | OFF | ON | ON | ON |
| K2 | OFF | OFF | ON | OFF |
| K3 | OFF | OFF | OFF | ON |

| MOTOR SPEED OPERATION | OFF | LOW SPEED | | | MEDIUM SPEED | HIGH SPEED | | |
|---|---|---|---|---|---|---|---|---|
| | 0 | 1 | 2 | 3 | 4 | 5 | 6 | 7 |
| CURRENT THROUGH FIELD WOUND COILS | 0 | POSITIVE | POSITIVE | POSITIVE | 0 | NEGATIVE | NEGATIVE | NEGATIVE |
| K1 | OFF | ON | ON | ON | ON | ON | ON | ON |
| K2 | OFF | ON | ON | ON | OFF | OFF | OFF | OFF |
| K3 | OFF | ON | OFF | OFF | OFF | ON | OFF | OFF |
| K4 | OFF | OFF | OFF | ON | OFF | OFF | ON | ON |
| K5 | X | OFF | OFF | ON | OFF | OFF | OFF | ON |
| K6 | OFF | ON | OFF | ON | OFF | OFF | ON | OFF |

FIG. 11

FLUX MODIFIER FOR A PERMANENT MAGNET BRUSH-TYPE MOTOR USING WOUND FIELD COILS COMBINED WITH PERMANENT MAGNETS

This application is based on U.S. Provisional Application No. 60/529,191, filed on Dec. 12, 2003 and claims the benefit thereof for priority purposes.

FIELD OF THE INVENTION

The invention relates to permanent magnet brush-type DC motors and, more particularly, to wound field coils combined with permanent magnets in a stator structure.

BACKGROUND OF THE INVENTION

A significant challenge of permanent magnet DC brush-type motors is to achieve different speeds of operation. Wound Field type motors generally have speed controlled by altering the field flux. This is done by changing the current or the number of coil turns of the field winding. Since permanent magnet motors have a constant field flux, they cannot achieve speed control by field flux variation.

Often, permanent magnet motors used in automotive applications require the use of more than one speed, usually a lower speed for general purpose operation and a maximum speed for worst case operation. For example, multiple speed operation of a vehicle cooling system module provides a more optimized engine temperature and operation, which consequently contributes to improved fuel economy.

For permanent magnet DC brush-type motors, historically lower speeds (multiple speed operation) have been achieved by the following methods:
  Adding a resistor in series with the motor
  Switching out brushes (lap wind motor)
  Dual armature winding with dual commutator
  Adding an additional $3^{rd}$ brush (short out coils)
  External or internal electronic control comprised of but not limited to:
  SSR, (Solid State Relays)
  Linear Control
  PWM, (Pulse Width Modulation)

FIGS. 1A, 1B and 1C show a magnetic circuit of 2 pole, 4 pole and 6 pole conventional brush-type permanent magnet DC motor, respectively. The lines of flux are created such that they leave the North Pole magnet and enter into the air gap. The flux lines enter into a lamination stack of a rotor of the motor and travel along the shortest possible path to the magnet of opposite polarity. The lines of flux again travel through the air gap and into the magnet of opposite polarity. The lines of flux then leave the second magnet and return back to the original magnet. Hence, the lines of flux are understood to operate in a closed loop circuit. The flux available in the air gap between the magnet and the rotor lamination determines the operating characteristics of the motor.

The magnetic flux can be produced using either a wound field stator or permanent magnet stator. FIG. 2 shows the magnetic circuit of a 2 pole wound field motor where the (N) coils of wire around a pole shoe 10 produce the magnetic flux. One concern is that motors with permanent magnets have a constant level of field flux (or stator flux) and hence only operate with one speed. The advantage of a wound field stator is that various windings can be applied to change the level of field flux or stator flux. The disadvantage of using a wound field stator is that in order to generate sufficient field flux, significant numbers of coil turns are required for each field coil. This requirement causes the stator to be bulky, heavy and relatively expensive.

In examination of conventional speed control methods another method to vary the motor flux is to combine permanent magnets with field wound coils to produce the desired level of flux.

SUMMARY OF THE INVENTION

An object of the invention is to fulfill the need referred to above. In accordance with the principles of the present invention, this objective is achieved by providing a stator and armature assembly for a permanent magnet DC motor. The assembly includes an armature having a lamination core and windings, and a stator structure associated with the armature. The armature is constructed and arranged to rotate with respect to the stator structure. The stator structure includes at least one permanent magnet providing a certain flux, and at least one wound core structure having a core and a coil wound about the core so as to define an alternate pole with respect to the permanent magnet. When current to the coil is controlled, flux of the stator structure can be increased or decreased relative to the stator flux. In this way a motor can operate at different speeds.

In accordance with another aspect of the invention, a method of controlling speed of a permanent magnet DC motor is provided. The motor includes an armature having a lamination core and windings; and a stator structure associated with the armature. The armature is constructed and arranged to rotate with respect to the stator structure. The stator structure includes at least two permanent magnets of the same polarity that provide a certain flux; and at least two wound core structures of the same polarity. Each wound core structure has a core and a coil wound about the core. The wound core structures define alternate poles with respect to the permanent magnets. The method provides switches operatively associated with the motor and coils. The switches are controlled so that 1) no current is provided to the coils so that the armature rotates at a certain speed based on the certain flux of the permanent magnets, 2) current is provided to the coils in one direction so that flux increases relative to the certain flux, causing the armature to rotate, for example, at a speed less than the certain speed or 3) current is provided to the coils in a direction opposite the one direction so that flux decreases relative to the certain flux, causing the armature to rotate, for example, at a speed greater than the certain speed.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 11 is a table of seven-speed switching operation for the circuit of FIG. 10.

DETAILED DESCRIPTION OF THE EXEMPLARY EMBODIMENT

Figure 1A:
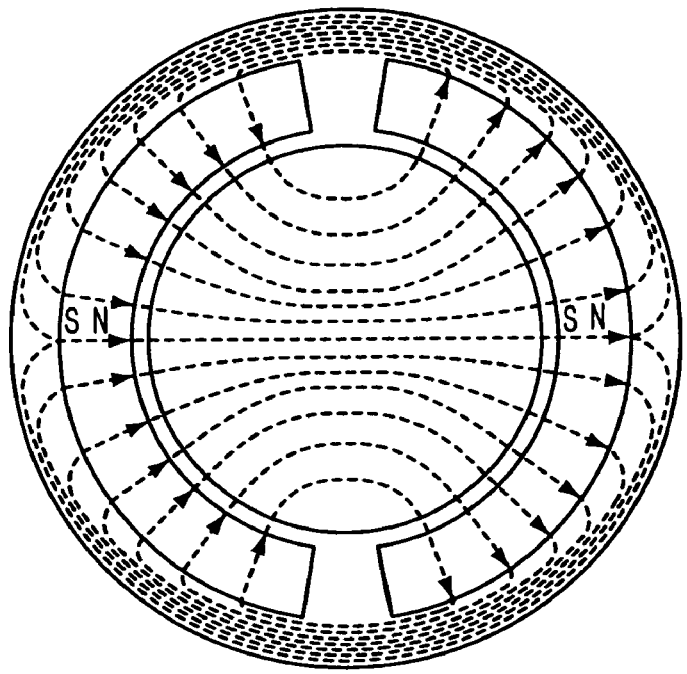
FIG. 1A shows a magnetic circuit for a conventional 2 pole brush-type permanent magnet motor.
Figure 1B:
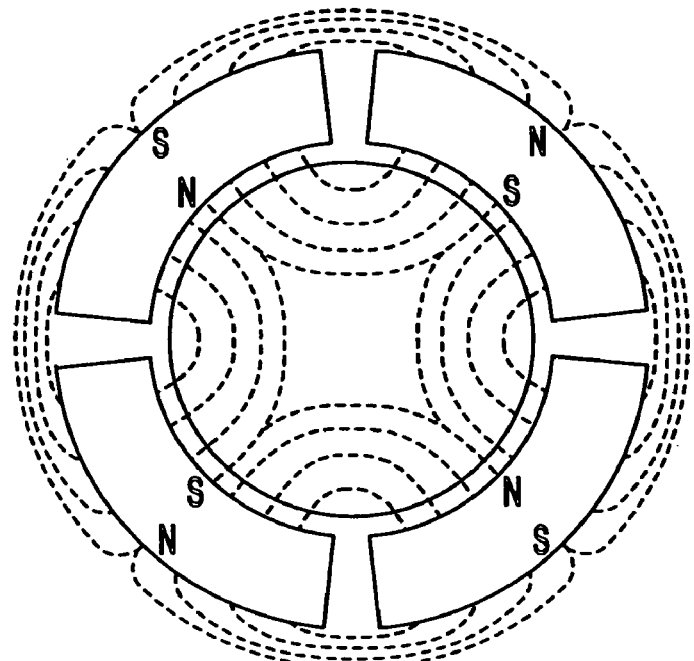
FIG. 1B shows a magnetic circuit for a conventional 4 pole brush-type permanent magnet motor.
Figure 1C:
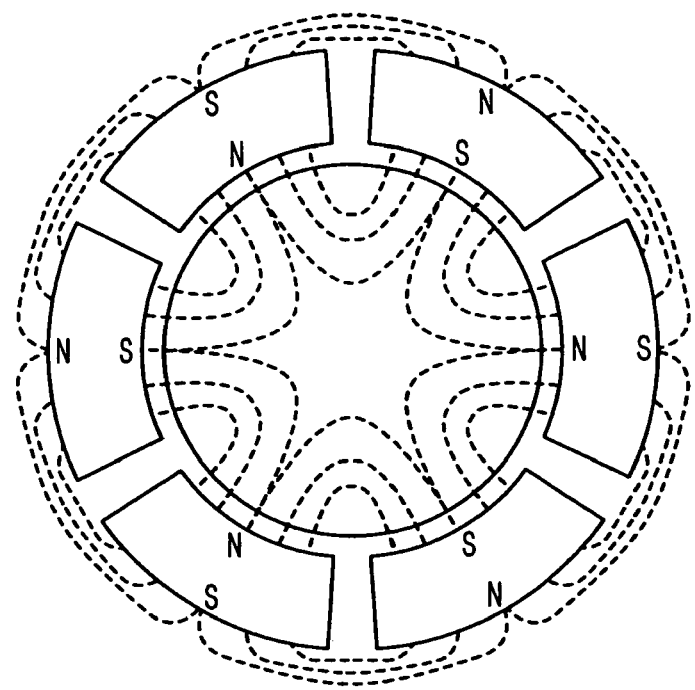
FIG. 1C shows a magnetic circuit for a conventional 6 pole brush-type permanent magnet motor.
Figure 2:
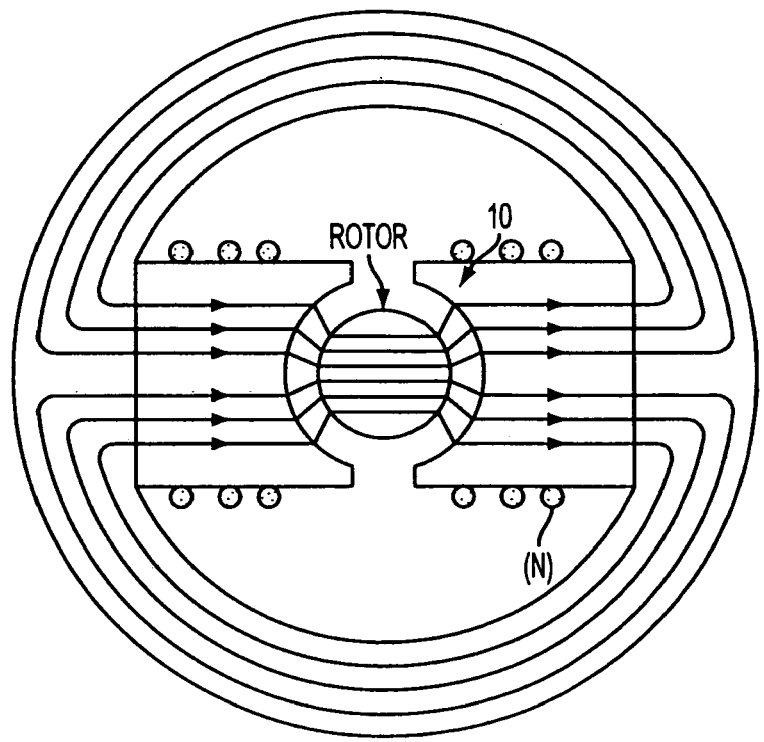
FIG. 2 shows a magnetic circuit of a conventional 2 pole wound field motor.
Figure 3:
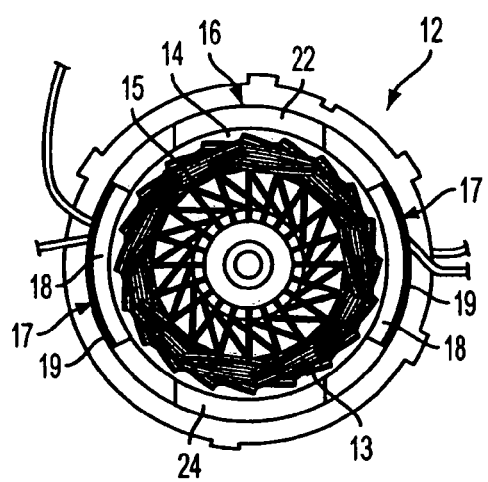
FIG. 3 is a plan view of 4 pole stator and armature assembly in accordance with the principles of the present invention.
Figure 7:
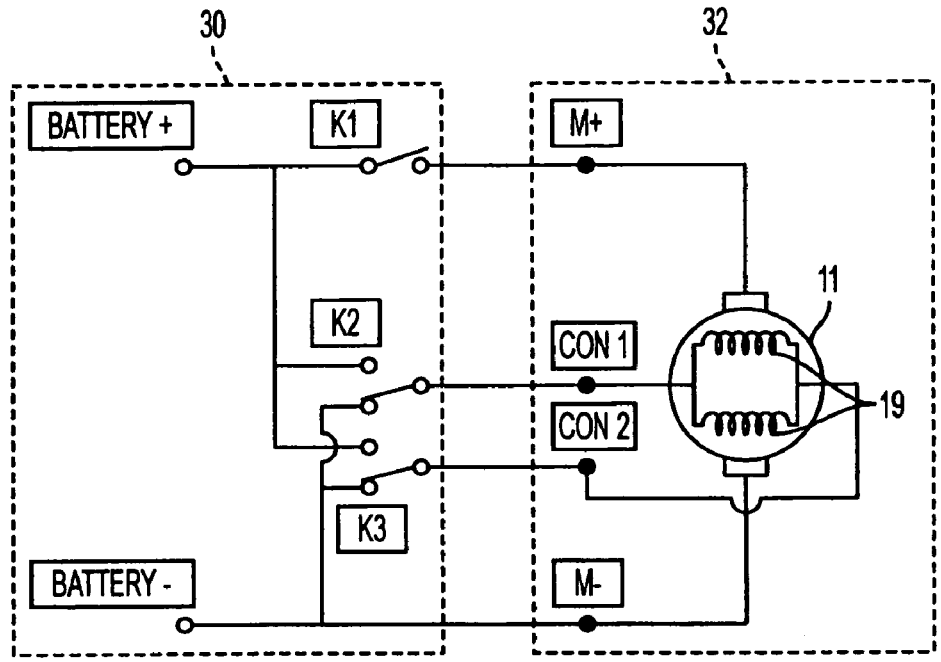
FIG. 7 is a schematic illustration showing coils of a motor of the invention being connected in parallel.

FIG. 3 shows a 4 pole stator and armature assembly, generally indicated at 12, provided in accordance with the principles of the invention for a four pole permanent magnet DC brush-type motor 11 (shown schematically in FIG. 7). The assembly 12 includes a conventional armature, generally indicated at 13, having a lamination core 14 and windings 15, and a stator structure, generally indicated at 16, surrounding the armature 13. The armature 13 is constructed and arranged to rotate with respect to the stator structure when the windings 15 are energized. The motor 11 can be of the type disclosed in U.S. Pat. No. 5,977,666, the contents of which is hereby incorporated into the present specification by reference. The motor 11 is preferably used in automotive applications such as, for example, engine cooling applications. Although a 4 pole assembly is shown, it can be appreciated that the invention is applicable to 2, 6, 8, . . . etc. pole motors.

Figure 4:
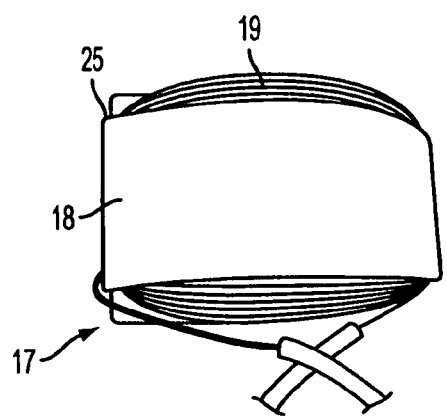
FIG. 4 is a plan view of a wound core structure of the stator and armature assembly of FIG. 3.
Figure 5:
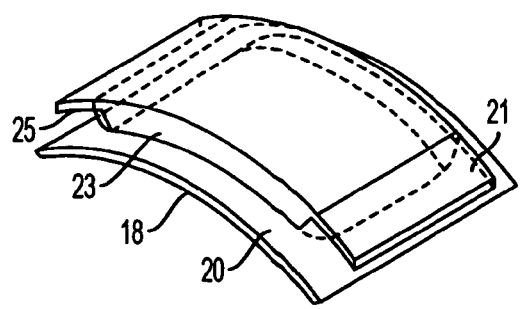
FIG. 5 is a perspective view of a ferrous core, of the wound core structure of FIG. 4, shown without wire coil.

In FIG. 3, in the stator structure 16, alternate pole pieces are wound core structures, generally indicated at 17. A wound core structure 17 is shown in FIG. 4 and includes a ferrous core 18 and a winding or coil 19 wound about the core 18. As shown in FIG. 5, the core 18 includes a base 20 and a bobbin member 21 extending from the base 20. The bobbin member 21 and base 20 are constructed and arranged to define a pocket 25 for receiving a portion of the coil 19. The bobbin member 21 has a peripheral surface 23 upon which the coil 19 is wound. The surface 23 can be coated with epoxy or other substances to provide electrical insulation between the coil 19 and core 18.

As shown in FIG. 3, the stator structure 16 main flux is supplied by the two permanent magnets 22 and 24 having the same polarity. The adjacent poles (cores) 18 are made from a ferrous material similar in geometric size to a permanent magnet 22 or 24. The two ferrous cores 18 are each configured so that a coil 19 of wire is wound to about the core 18 and energizing the coil 19 provides extra field flux to the assembly 12. This additional flux created by the coils 19 is used to enhance or reduce the main field flux created by the permanent magnets 22 and 24.

The two coils 19 are wound similarly to a wound field motor. The coils 19 are each wound with "N" turns of "X" gauge wire and are wound in the same direction and are of the same polarity when coils are energized. The polarity of the wound cores is determined by the direction of the wire winding in coils 19 and the direction of current flowing through the coils 19. The coils 19 are wound either in a Clockwise (CW) or Counter-Clockwise (CCW). The coils 19 are installed around the ferrite core 18 at alternate positions relative to the permanent magnets 22 and 24.

The motor and permanent magnet circuits are configured so that the motor's magnetic field is significantly below the magnetic saturation point for the closed loop magnetic circuits. This will likely be the case since the number of permanent magnets has been reduced by half as compared to a conventional permanent magnet motor. Hence, each magnetic circuit (Pole) is only supported by one permanent magnet and not by two, as in a conventional permanent magnet motor. This results in a lower operating point for the magnet (due to a lower slope on the magnet load line, Pc Line).

Figure 6:
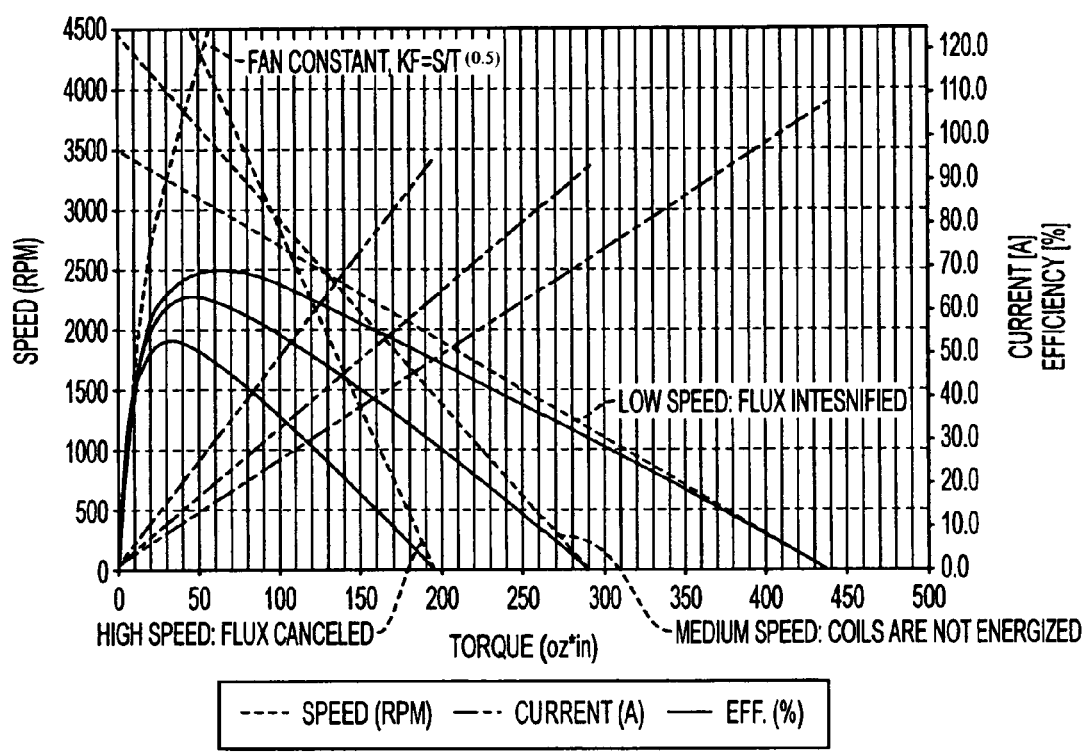
FIG. 6 is a graph of motor operation characteristics of a motor of the invention.

When there is no flux intervention from the stator coils 19, the motor 11 operates at a certain speed (Medium Speed). The motor operation characteristics are illustrated in FIG. 6. The flux level can be increased by adding extra flux generated by the field coils 19. The additional flux slows the motor 11, thus defining a Low Speed when flux is added to the motor. The field coils 19 are used to diminish the flux from the permanent magnet motor 11 by energizing the coils 19 in the opposite direction. The effect of this is to increase the operating speed of the motor (High Speed).

Figure 8:
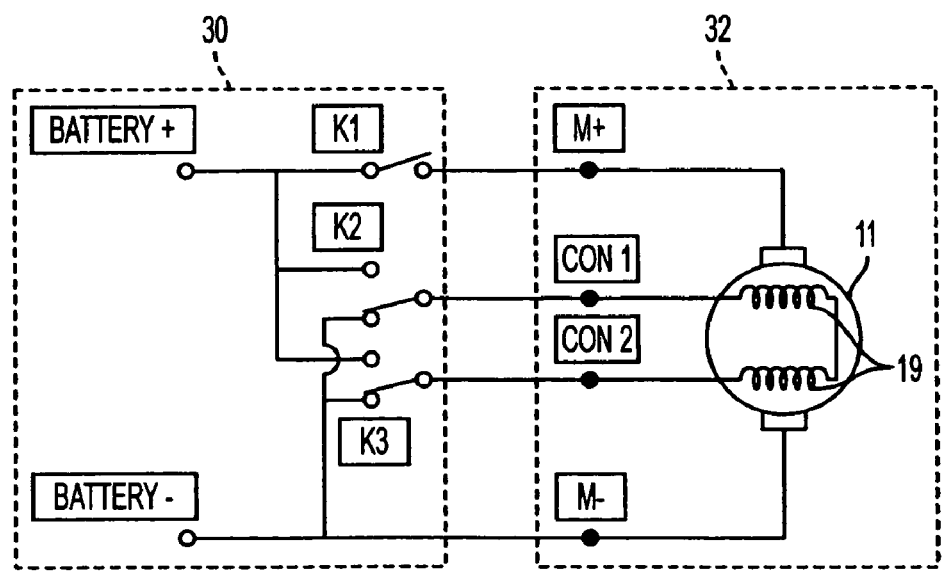
FIG. 8 is a schematic illustration showing coils of a motor of the invention being connected in series.

Therefore, three different operating speeds (Medium, Low and High) can be accomplished. A switching scheme for three-speed operation is tabulated in FIG. 9, with K1–K3 being power switches, such as, for example, electromagnetic relays or MOSFETs. Furthermore, the coils 19 can be connected electrically in parallel to each other (FIG. 7) or in series (FIG. 8). FIGS. 7 and 8 show electrical connection between a vehicle electrical system 30 and an engine cooling module 32 of a vehicle. In FIGS. 7 and 8, CON is the power connection to the field wound coils 19, M+ is motor Positive Connection, and M– is motor Negative Connection. FIG. 6 shows a graph of motor operation characteristics of a motor of the invention. In FIGS. 7 and 8, the coils are not energized. The K1, K2, and K3 switches are in "OFF" position. The motor flux is due to magnets only.

Figures 9, 10:
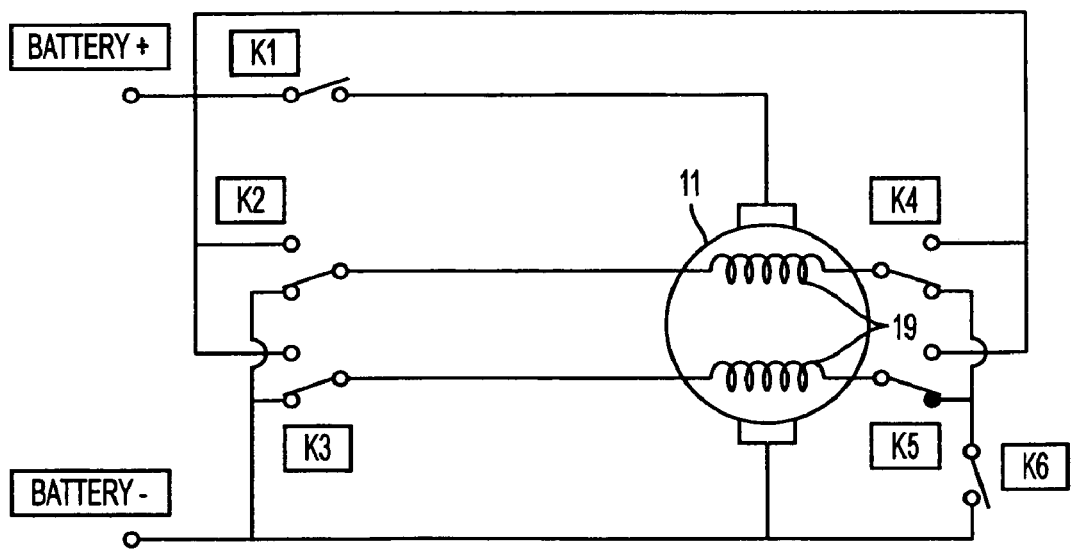
FIG. 9 is a table showing a three speed switching operation of a motor of FIGS. 7 and 8.
FIG. 10 is a schematic illustration showing a coil switching arrangement of a motor according to another embodiment of the invention.

Additional speed variation can be achieved by selectively energizing (switching) coils 19 independently from each other or together in combination in series and parallel connection. An example of this switching method is tabulated in FIG. 11 and illustrated schematically in FIG. 10. In this case the coils are not energized. The K1, K2 . . . K6 switches are in "OFF" position. The motor flux is due to magnets only. Note that up to seven different speeds can be achieved by selectively controlling current to the coils 19. K1–K6 are power switches, such as, for example, electromagnetic relays or MOSFETs. In FIG. 10, the switches are considered to be part of the motor, but can be separate therefrom.

It can be appreciated that the core 18 can be a separate part that is assembled to the stator structure housing and thereafter wound. Alternatively, the separate core 18 can be wound and then mounted to the stator structure housing.

Another option is to create the core integral with the wall of the stator structure housing and then wind the coil thereabout.

Thus, permanent magnets are combined with field wound coils to produce the overall flux level of the stator structure 16. Furthermore the basic motor 11 has a fixed flux level due to the two permanent magnets 22, 24 and the two field-wound coils 19. When the coils are energized they can add to or cancel out the flux in the stator structure 16. The flux change in the motor will provide a variable operating speed.

Advantages of the stator structure 16 include:
1. The motor speed is controlled by the field coils 19.
2. The motor main flux is produced by the permanent magnets 22 and 24.
3. The current levels in the field coils 19 are low and this allows the use of smaller relays.
4. Good motor efficiency at low speed.
5. Vehicle relay system can be used to control power to wound field coils.

Other features of the stator structure 16 include:
1. Combination of wound field coils 19 and permanent magnets to achieve motor action.
2. Changing motor speed by replacing "n" magnets with "n" wound field coils 19 and switching coils 19 ON, OFF, and Reverse-ON.
3. Use of single coils connected with power switch (Relay/MOSFET) in series or parallel to achieve change in flux or motor speed.
4. Use of pre-connected field wound coils with power switches (Relay/MOSFET) in series or parallel to achieve change in flux or motor speed.
5. Coils being independent components or integral part of housing component/assembly.
6. Power switches can be part of the motor assembly or built into an external box, or part of the car Engine Computer Unit, or part of the vehicle electrical system.
7. Voltage of at least one coil 19 can be detected to measure armature speed change for use in stall protection at the same time or independently. Alternatively, an additional winding can be added to sense armature speed.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A stator and armature assembly for a permanent magnet DC motor, comprising:
   an armature having a lamination core and windings, and
   a stator structure associated with the armature, the armature being constructed and arranged to rotate with respect to the stator structure, the stator structure comprising:
   at least one permanent magnet defining a pole and providing a certain flux, and
   at least one wound core structure having a core and a coil wound about the core so as to define an alternate pole with respect to the permanent magnet such that controlling current to the coil increases or decreases flux in the stator structure relative to the certain flux,
   wherein the core is of generally the same geometric size as the permanent magnet.

2. The assembly of claim 1, wherein the core is of ferrous material and has a peripheral surface about which the coil is wound.

3. The assembly of claim 1, wherein the core includes a base and a bobbin member extending from the base, the bobbin member and base being constructed and arranged to define a pocket for receiving a portion of the coil.

4. The assembly of claim 3, wherein the bobbin member has a peripheral surface about which the coil is wound.

5. The assembly of claim 4, wherein the surface is electrically insulated.

6. The assembly of claim 1, wherein the stator structure has a housing, the core being separate from the housing and mounted thereto.

7. The assembly of claim 1, wherein the stator structure has a housing, the core being integral with the housing.

8. A stator structure for a permanent magnet DC motor, the stator structure comprising:
   at least one permanent magnet defining a pole and providing a certain flux, and
   at least one wound core structure having a core and a coil wound about the core so as to define an alternate pole with respect to the permanent magnet such that controlling current to the coil increases or decreases flux in the stator structure relative to the certain flux,
   wherein the core includes a base and a bobbin member extending from the base, the bobbin member and base being constructed and arranged to define a pocket for receiving a portion of the coil,
   wherein the core is of generally the same geometric size as the permanent magnet.

9. The structure of claim 8, wherein the core is of ferrous material and has a peripheral surface about which the coil is wound.

10. The structure of claim 9, wherein the stator structure has a housing, the core being separate from the housing and mounted thereto.

11. The structure of claim 9, wherein the stator structure has a housing, the core being integral with the housing.

12. A stator structure for a permanent magnet DC motor, the stator structure comprising:
    at least two permanent magnets of the same polarity and providing a certain flux, and
    at least two wound core structures of the same polarity, each wound core structure having a core and a coil wound about the core, the wound core structures defining alternate poles with respect to the permanent magnets such that controlling current to the coils increases or decreases flux in the stator structure relative to the certain flux,
    wherein each core includes a base and a bobbin member extending from the base, the bobbin member and base being constructed and arranged to define a pocket for receiving a portion of and associated coil.

13. The structure of claim 12, wherein each core is of ferrous material and has a peripheral surface about which the coil is wound.

14. The structure of claim 12, wherein each core is of generally the same geometric size as each permanent magnet.

15. The structure of claim 12, in combination with an armature, the armature having a lamination core and windings, and being constructed and arranged to rotate with respect to the stator structure.

16. The structure of claim 12, wherein the stator structure has a housing, the core being separate from the housing and mounted thereto.

17. The assembly of claim 12, wherein the stator structure has a housing, the core being integral with the housing.

18. A permanent magnet DC motor, the motor including:
armature having a lamination core and windings, and
a stator structure associated with the armature, the armature being constructed and arranged to rotate with respect to the stator structure, the stator structure comprising:
at least two permanent magnets of the same polarity and providing a certain flux, and
at least two wound core structures of the same polarity, each wound core structure having a core and a coil wound about the core, the wound core structures defining alternate poles with respect to the permanent magnets such that controlling current to the coils increases or decreases flux in the stator structure relative to the certain flux.

19. The motor of claim 18, wherein the coils are connected electrically in parallel.

20. The motor of claim 18, wherein the coils are connected electrically in series.

21. The motor of claim 18, in combination with switches constructed and arranged with respect to the motor and coils to be selectively controlled to control current to the coils and thereby flux in the stator structure to rotate the armature and thus the motor at different speeds.

22. The combination of claim 21, wherein the switches are constructed and arranged such that when 1) no current is provided to the coils, the armature rotates at a certain speed, 2) current is provided to certain of the coils in one direction, flux increases causing the armature to rotate at a speed less than the certain speed and 3) current is provided to certain of the coils in a direction opposite the one direction, flux decreases causing the armature to rotate at a speed greater than the certain speed.

23. The combination of claim 21, wherein the switches are separate from the motor.

24. The combination of claim 21, wherein the switches are integral with the motor.

25. The motor of claim 18, wherein the stator structure has a housing, the core being separate from the housing and mounted thereto.

26. The motor of claim 18, wherein the stator structure has a housing, the core being integral with the housing.

* * * * *